Oct. 6, 1964 H. DIEDRICH ETAL 3,152,026
METHOD OF MANUFACTURING SEMI-CONDUCTOR DEVICES
OF THE WIDE-GAP ELECTRODE TYPE
Filed Oct. 17, 1961
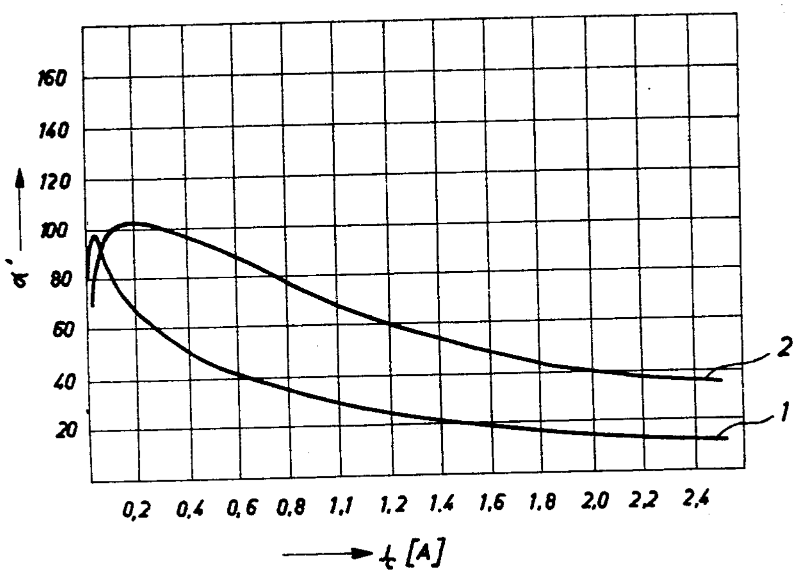
INVENTOR
HEINZ DIEDRICH
KLAUS JÖTTEN
BY
AGENT

United States Patent Office 3,152,026
Patented Oct. 6, 1964

3,152,026

METHOD OF MANUFACTURING SEMI-CONDUCTOR DEVICES OF THE WIDE-GAP ELECTRODE TYPE

Heinz Diedrich, Hamburg, and Klaus Jötten, Hamburg, Blankenese, Germany, assignors to North American Philips Company, Inc., New York, N.Y., a corporation of Delaware Filed Oct. 17, 1961, Ser. No. 145,564
Claims priority, application Germany Oct. 20, 1960
5 Claims. (Cl. 148—185)

This invention relates to methods of manufacturing semi-conductor devices and more particularly transistors of germanium or silicon having one or more junctions, more particularly p-n-junctions, at least one junction being formed by melting-deposition of a material which, upon cooling, produces a recrystallized semi-conductive zone on the body of the semi-conductor device, which recrystallized semi-conductive zone has a gap wider than that of the body of the semi-conductor device.

It is known that the share of the emitter current in a transistor which still effectively adds to the collector current for high currents decreases with increasing current, that is to say that, for example in the case of a p-n-p-transistor of germanium, the ratio between the holes injected into the base by the emitter and the electrons flowing from the base into the emitter steadily decreases for higher currents. This undesirable property of a transistor, namely the decrease in current amplification with increasing current, has given rise to a search for methods of raising the said ratio also for comparatively high currents. Since with an ordinary p-n-junction, that is to say a p-n-junction in which both the p- and n-zones are semi-conductors having equal gaps, the ratio of the currents depends substantially upon the specific resistance of the semi-conductors forming the p- and n-zones, it has been endeavoured to increase the said ratio by particularly high doping (very low specific resistance) of the emitter zone with respect to the base zone. An arbitrary increase in the conductivity of the emitter zone with respect to that of the base zone is impossible for technological and electrical reasons. This limit of the injection quality of ordinary p-n-junctions, which is determined by the method of manufacture and the electrical behaviour, may be avoided by the use of wide-gap emitters.

In fact, it is also known that, as compared to the ordinary emitter, the emitter of a transistor preferably passes charge carriers of the desired kind from a semi-conductor having a gap wider than that of the base material and hinders the charge carriers of the unwanted kind to a comparatively great extent due to the existing quasi-electrical field. This effect plays a part not only for the emitter of a transistor for which the prevailing conditions have been explained hereinbefore, but may in general also have favourable results in semi-conductor devices having one or more p-n-junctions and junctions between material having a wider gap and material having a smaller gap, wherein the same conductivity type exists on each side of the junction.

As is well-known, in certain $A_{III}$-$B_V$-compounds, that is to say, compounds consisting of an element of the III-group and an element of the V-group, the gap is wider than in germanium or silicon. Since germanium and silicon with $A_{III}$-$B_V$-compounds in limited mixing ratios may form mixed crystals, it has previously been suggested to manufacture wide-gap electrodes by alloying $A_{III}$-$B_V$-compounds on germanium or silicon. This meets with difficulty in practice because of the technological properties of $A_{III}$-$B_V$-compounds.

The difficulties are overcome by the invention.

To this end, in a method of manufacturing a semi-conductor device, more particularly a transistor of germanium or silicon having one or more junctions, more particularly p-n-junctions, in which at least one junction is formed by melting-deposition of a substance which, upon cooling, produces a recrystallized semi-conductive zone on the body of the semi-conductor device, which recrystallized semi-conductive zone has a gap wider than that of the body of the semi-conductor device, according to the invention the junction or each junction is formed by melting-deposition of an alloy consisting at least of an $A_{III}$-$B_V$-compound and one or more elements of the III-group or one or more elements of the V-group of the periodic table. The element or one of the elements of the III-group or the V-group may also be the element present in the $A_{III}$-$B_V$-compound. The melting temperature and the melting period are preferably chosen so that the alloy is deposited at so low a temperature and within so short a period that the square root of the product of the diffusion constant of the acceptor or donor element of the III- or V-group in the alloy which diffuses at maximum velocity at the melting temperature, and of the melting period, is at most $10^{-5}$ cm.

The invention will now be described in detail with reference to examples of several embodiments.

The sole figure of the accompanying drawing serves to illustrate the improved efficiency of a transistor made in accordance with the invention.

*Embodiment 1*

A p-n-p-transistor of germanium is manufactured by the conventional alloying technique. In carrying out the method according to the invention, for the manufacture of an emitter, a pellet made of an alloy consisting of 98.3 at. percent of indium, 0.7 at. percent of phosphorus and 1 at. percent of gallium is melted on the body of the semi-conductor device.

The gap of the indium phosphide is 1.27 electron volts against 0.66 electron volt with germanium, so that mixture of the two components provides a gap wider than that of the body of germanium.

To prevent components of the alloy to be provided from diffusing into the body to an extent which can be proved, the melting period and the melting temperature are to be so chosen that the term $\sqrt{Dt}$ occurring in the diffusion law is, for example, smaller than $10^{-5}$ cm., wherein $t$ represents the melting period in seconds and D represents in cm.$^2$/sec. the diffusion constant of the acceptor or donor element of the III- or V-group in the alloy which diffuses into the material of the body at the melting temperature with maximum velocity. This remark also applies to the further examples of embodiments. In Embodiment 1 the condition is fulfilled, provided that the melting temperature is lower than 600° C. and the alloying period is shorter than 30 minutes.

The figure shows the improved operation of such a transistor. The collector current $I_c$ is plotted on the abscissa and the current amplification factor $\alpha'$ is plotted in the usual manner in the ordinate. Curve 1 shows the dependency of $\alpha'$ upon the collector current $I_c$ in a transistor the geometry of which corresponds to the transistor to be compared and the emitter of which consists of the known gallium-indium alloy. Curve 2 shows the dependency to a $\alpha'$ upon the collector current $I_c$ in a transistor having an emitter made from an alloy according to the invention. The considerably slower decline of $\alpha'$ after its maximum with increasing collector current with respect to transistors of the ordinary type can be clearly seen.

*Embodiment 2*

A p-n-p-transistor of silicon is manufactured by the conventional alloying technique. In carrying out the method according to the invention, for manufacturing the emitter, an alloy consisting of 2 mol. percent of aluminum-antimonide and for the balance of aluminum is melted on the body of the semi-conductor device. The gap of the aluminum-antimonide is 1.52 electron volts against 1.09 electron volts in silicon, so that mixing of the two components provides a gap wider than that of the body of silicon. The alloying temperature is 900° C. or lower, preferably 760° C. or lower. The alloying period is shorter than 30 minutes.

*Embodiment 3*

A p-n-p-transistor of silicon is manufactured by the conventional alloying technique. In carrying out the method according to the invention, for manufacturing the emitter, aluminum is melted in known manner at 760° C. on the body of the semi-conductor device. Subsequently, the semi-conductor device is exposed to a temperature from 765° C. to 800° C. for 15 minutes in a closed quartz ampulla which also contains about 1 gm. of powdery antimony. During exposure, an antimony vapour-pressure determined by the temperature is obtained in the quartz ampulla. The gaseous antimony diffuses into the molten aluminum-silicon layer, resulting in situ in a mixture of aluminum and antimony which, upon cooling at a rate of 3° C./min., together with silicon recrystallizes as aluminum-antimonide at the p-n-junction, thus forming a wide-gap emitter. As regards the gaps the same remark applies as in Embodiment 2.

*Embodiment 4*

A p-n-p-transistor of germanium is manufactured by the conventional alloying technique. In carrying out the method according to the invention, for manufacturing the emitter, indium and 2 mol. percent of indium-phosphide and/or 2 mol. percent of gallium phosphide are melted together at 800° C. in a closed quartz ampulla. The melt is cooled to room temperature within 1 minute in order to guarantee a homogeneous alloy. A pellet is then formed from the alloy in known manner and melted on the body of the semi-conductor device. The alloying temperature is 600° C. and adapts itself to the alloying depth desired. The alloying period is shorter than 30 minutes. The rate of cooling of the semi-conductor device is less than 20° C./min. The gap of the indium-phosphide is 1.27 electron volts and that of the gallium-phosphide is 2.25 electron volts against 0.66 electron volt in germanium, so that mixing of the components provides a gap wider than that of the body of germanium.

*Embodiment 5*

A p-n-p-transistor of germanium is manufactured by the conventional alloying technique. In carrying out the method according to the invention, for manufacturing the emitter, an alloy is used consisting of 2.5 mol. percent of indium-phosphide, 1 at. percent of gallium, the balance of indium. The manufacturing phases are the same as described in Embodiment 4.

Transistors manufactured by the method according to the invention show the advantageous behaviour of $\alpha'$ with increasing collector current, as illustrated by curve 2.

What is claimed is:

1. A method of manufacturing a transistor device of a semiconductive material selected from the group consisting of germanium and silicon, comprising providing a body of said semiconductive material having a given forbidden energy gap between its valence and conduction energy bands and including a region of given conductivity type, forming by a heating step a melt at said region of given conductivity type of a mass of material consisting essentially of an alloy of at least two constituents, the first constituent being an $A_{III}$-$B_V$ compound, wherein $A_{III}$ is an element selected from the group consisting of boron, aluminum, gallium and indium, and $B_V$ is an element selected from the group consisting of phosphorus, arsenic and antimony, the second constituent predominating and being selected from the group consisting of an $A_{III}$ elemet and a $B_V$ element, and cooling the said mass to recrystallize a semiconductive zone, in contact with an underlying portion of said region of given conductivity type, possessing a conductivity type opposite to that of said given type, said recrystallized zone further including an $A_{III}$-$B_V$ compound possessing a forbidden energy gap between its valence and conduction bands wider than said given gap, the temperature and duration of said heating step having values at which $(Dt)^{1/2}$ is less than $10^{-5}$ cm., where D represents in cm.$^2$/sec. the diffusion constant of the element of the alloy having the maximum diffusion velocity at the heating temperature and $t$ represents the duration of the melting period in seconds, thereby avoiding any substantial diffusion of the alloy constituents into the body.

2. A method as set forth in claim 1 wherein the first constituent is aluminum antimonide, the second constituent is aluminum, and the semiconductor is silicon.

3. A method as set forth in claim 1 wherein the first constituent is selected from the group consisting of indium phosphide and gallium phosphide, the second constituent is selected from the group consisting of indium and gallium, and the semiconductor is germanium.

4. A method as set forth in claim 1 wherein the semiconductor is germanium, and the mass consists of 0.5 to 2.5 atomic percent of phosphorus, and the remainder indium.

5. A method as set forth in claim 1 wherein the semiconductor is germanium, and the mass consists of 0.5 to 2.5 atomic percent of phosphorus, less than 2 atomic percent of gallium, and the remainder indium.

References Cited in the file of this patent

UNITED STATES PATENTS

| | | |
|---|---|---|
| 2,847,335 | Gremmelmaier et al. | Aug. 12, 1958 |
| 3,010,855 | Barson et al. | Nov. 28, 1961 |
| 3,029,170 | Lamming | Apr. 10, 1962 |

FOREIGN PATENTS

| | | |
|---|---|---|
| 805,493 | Great Britain | Dec. 10, 1958 |